(12) United States Patent
Hyun et al.

(10) Patent No.: US 7,813,775 B2
(45) Date of Patent: Oct. 12, 2010

(54) PORTABLE TERMINAL FOLDABLE TO FORM A TRIANGULAR PRISM

(75) Inventors: Seung-Hee Hyun, Incheon (KR);
Myoung-Hoon Park, Seoul (KR);
Soo-Ik Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 286 days.

(21) Appl. No.: 11/344,005

(22) Filed: Feb. 1, 2006

(65) Prior Publication Data
US 2007/0072657 A1 Mar. 29, 2007

(30) Foreign Application Priority Data
Sep. 27, 2005 (KR) ..................... 10-2005-0089867

(51) Int. Cl.
*H04M 1/00* (2006.01)
*H04B 1/38* (2006.01)
(52) U.S. Cl. .................. 455/575.3; 455/66.1; 455/566; 455/575.4; 455/575.1
(58) Field of Classification Search ... 455/575.1–575.4, 455/66.1, 566
See application file for complete search history.

(56) References Cited

U.S. PATENT DOCUMENTS

| | | | |
|---|---|---|---|
| 5,260,998 A | 11/1993 | Takagi | |
| 5,926,364 A * | 7/1999 | Karidis | 361/681 |
| 2001/0034229 A1* | 10/2001 | Park et al. | 455/426 |
| 2006/0183435 A1* | 8/2006 | Chen | 455/90.3 |

FOREIGN PATENT DOCUMENTS

| | | |
|---|---|---|
| CN | 1612487 A | 5/2005 |
| EP | 1396982 A1 | 3/2004 |
| EP | 1528758 A | 5/2005 |
| GB | 2 295 744 A | 6/1996 |
| KR | 1020020088116 | 11/2002 |
| KR | 1020040061041 | 7/2004 |
| WO | WO 03/081880 A | 2/2003 |

* cited by examiner

*Primary Examiner*—Charles N Appiah
*Assistant Examiner*—Emem Stephen
(74) *Attorney, Agent, or Firm*—Roylance, Abrams, Berdo & Goodman, L.L.P.

(57) ABSTRACT

A portable terminal is provided. The portable terminal includes first, second and third housings. The second housing is rotatably engaged with one portion of the first housing. The third housing has one end engaged to linearly move closely beneath the rear surface of the second housing and the other end rotatably engaged with the other portion of the first housing. The third housing is folded onto the first housing, interposed between the first housing and the second housing, and when the second housing and the third housing rotate away from the first housing, the first, second and third housings form a triangular prism.

21 Claims, 13 Drawing Sheets

PORTABLE TERMINAL FOLDABLE TO FORM A TRIANGULAR PRISM

PRIORITY

This application claims the benefit under 35 U.S.C. §119(a) of a Korean Patent Application filed in the Korean Intellectual Property Office on Sep. 27, 2005 and assigned Serial No. 2005-89867, the entire contents of which are hereby incorporated by reference.

BACKGROUND OF THE INVENTION

1. Field of the Invention

The present invention relates generally to a portable terminal, and in particular, to a portable terminal for enabling convenient Digital Multimedia Broadcasting (DMB) viewing.

2. Description of the Related Art

Typically, a portable terminal refers to a device which provides wireless communications between users or between a user and a service provider through a Base Station (BS) or an access point. A wide range of service contents are provided to users through portable terminals, such as voice call, Short Message Service (SMS), mobile banking, television viewing, on-line games, and Video On Demand (VOD).

The portable terminals may be classified into a bar type, a flip type, and a folder type according to their looks. The bar-type portable terminal has communication circuits and an input/output device with a transmitter and a receiver in one housing. The flip type is formed by adding a flip cover to the configuration of the bar type. The folder type is so configured as to be opened or closed along with the rotation of a pair of housings and as to have an input/output device separately in the housings. A sliding-type portable terminals increase portability and use convenience and satisfy various user demands.

While mobile communication services provided through these portable terminals may have been limited to voice call and SMS message transmission at an early developmental stage, expanded services may include, for example, games, transmission of music and moving pictures, on-line games, and multimedia service.

DMB service may be commercialized using the portable terminals as DMB receivers. Since existing portable terminals are designed to fulfill the functions of voice call and message transmission, for long-time DMB viewing, an additional cradle for mounting a portable terminal therein may be required or a user may have to handhold his portable terminal to place the display at the eye level. In addition, the displays of the conventional portable terminals may have a large length relative to a width, thus being unsuitable for viewing broadcasting programs. Because the DMB service, like standard terrestrial television broadcasting, may present pictures at an aspect ratio with a relatively large width with respect to a length, broadcast pictures may not be viewed with full utilization of the screen area of the display of the conventional portable terminal.

SUMMARY OF THE INVENTION

According to one aspect of the present invention, a portable terminal including first, second and third housings is provided. The second housing is rotatably engaged with one portion of the first housing. The third housing has one end engaged to linearly move closely beneath the rear surface of the second housing and the other end rotatably engaged with the other portion of the first housing. The third housing is folded onto the first housing, interposed between the first housing and the second housing, and when the second housing and the third housing rotate away from the first housing, the first, second and third housings form a triangular prism.

According to another aspect of the present invention, a portable terminal including first, second and third housings is provided. The second housing has an opening penetrating through both surfaces of the second housing and is rotatably engaged with one portion of the first housing. The third housing has a display and is rotatably engaged with the other portion of the first housing. The second and third housings are foldable to the first housing, and when the second and third housings are folded to the first housing, the display is partially exposed through the opening.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF THE PREFERRED EMBODIMENTS

Preferred embodiments of the present invention will be described herein below with reference to the accompanying drawings. In the following description, well-known functions or constructions are omitted for clarity and conciseness.

Figure 1:
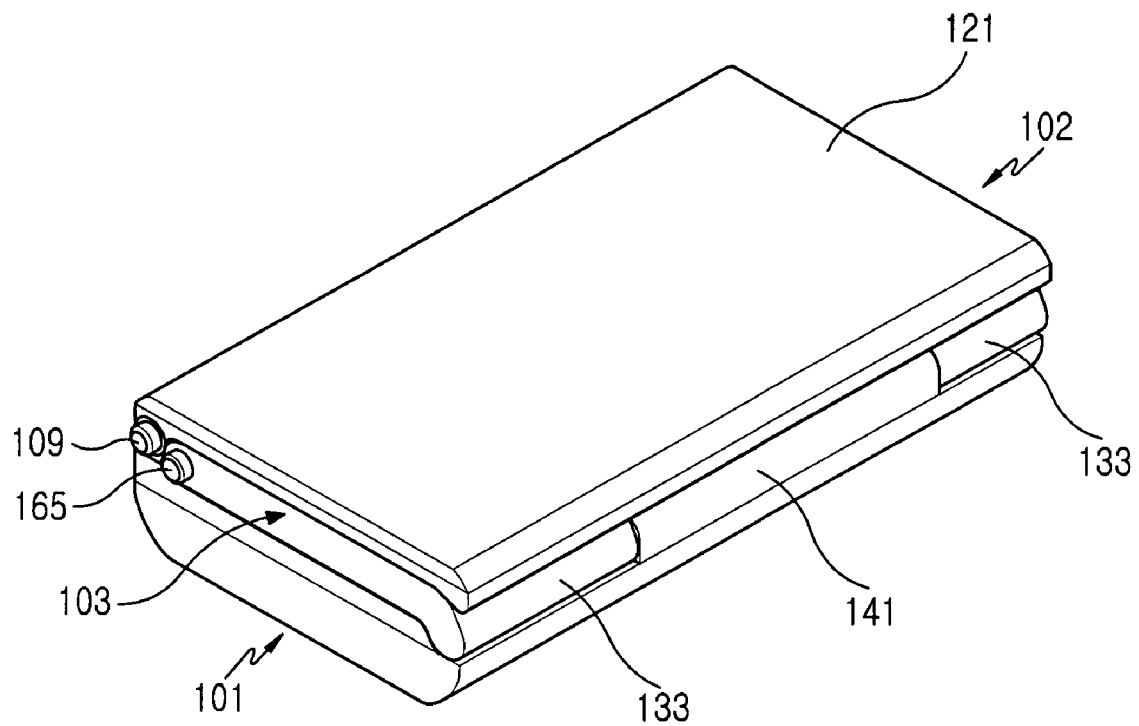
FIG. 1 is a perspective view of a portable terminal according to a preferred embodiment of the present invention.
Figure 2:
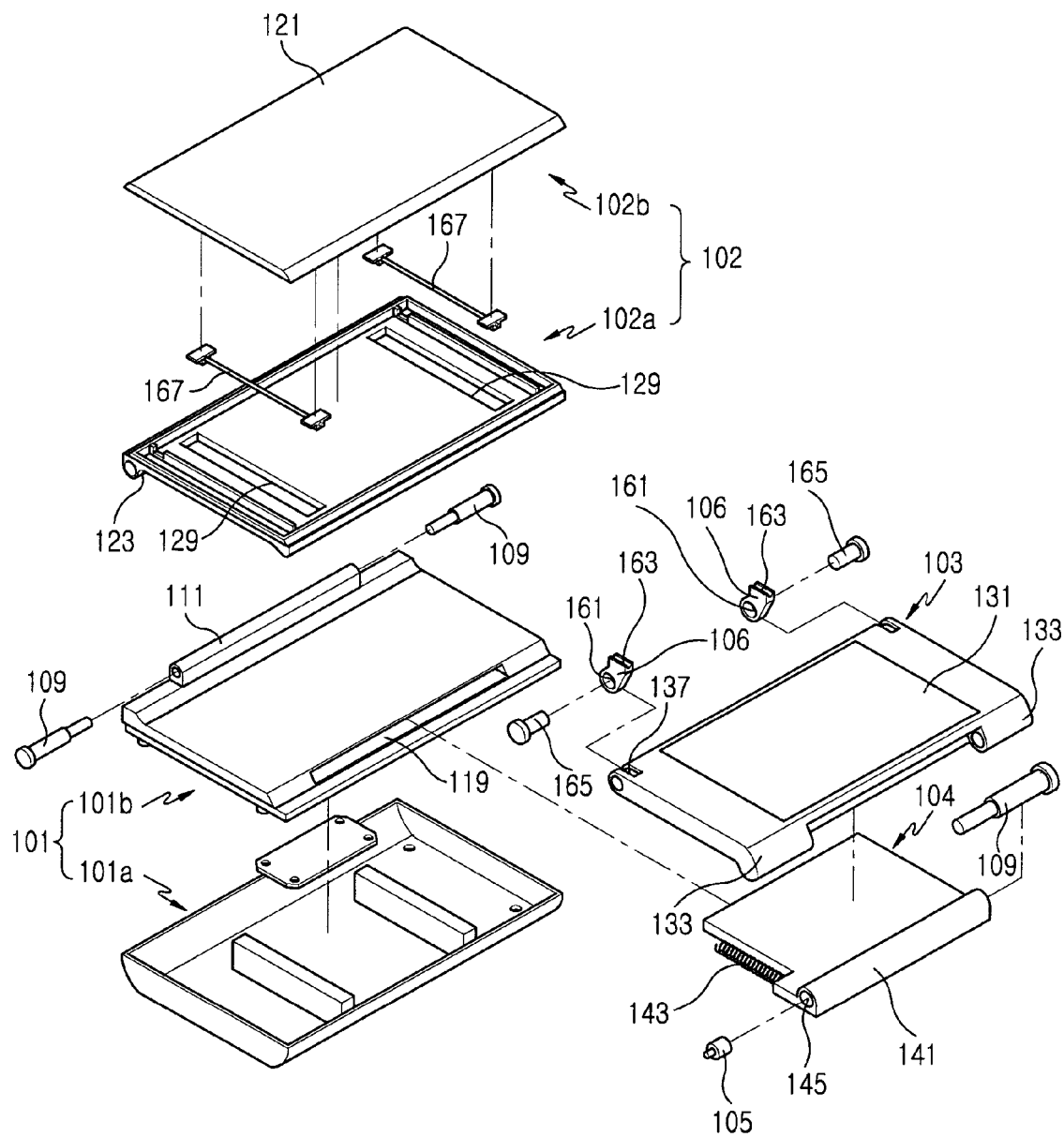
FIG. 2 is an exploded perspective view of the portable terminal illustrated in FIG. 1.
Figure 3:
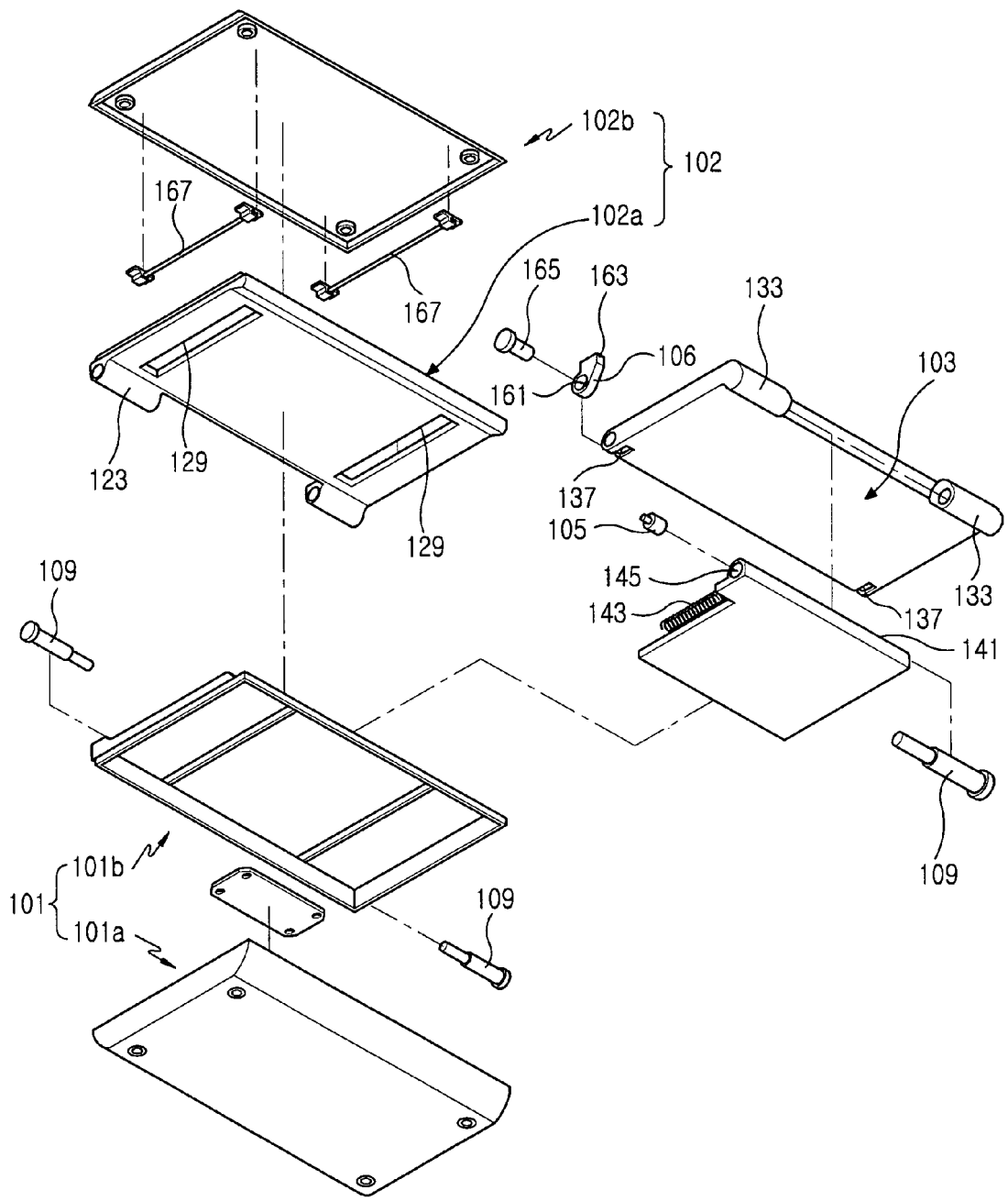
FIG. 3 is an exploded perspective view of the portable terminal illustrated in FIG. 1, taken from a different direction.

Referring to FIGS. 1, 2 and 3, a portable terminal 100 according to a preferred embodiment of the present invention includes a first housing 101, a second housing 102, and a third housing 103. The second and third housings 102 and 103 are rotatably engaged with the first housing 101. The portable terminal may be any wireless communication device including but not limited to a mobile station, PDA and computer. When the second and third housings 102 and 103 are folded on the first housing 101, the third housing 103 is interposed between the first and second housings 101 and 102. As the second and third housings 102 and 103 rotate, receding from the first housing 101, the first, second and third housings 101, 102 and 103 form a triangular prism.

The first housing 101 is comprised of a base housing 101a and a cover housing 101b engaged with the base housing 101a. The second housing 102 has a rotation housing 102a and a cover plate 102b engaged with the rotation housing 102a.

The first housing 101 is provided, at one portion thereof, with a first center hinge arm 111 and the second housing 102 is provided, at one portion thereof, with a pair of first side hinge arms 123 facing each other. The first side hinge arms 123 are rotatably engaged with both ends of the first center hinge arm 111 so that the second housing 102 can rotate over the first housing 101. Rotation pins 109 can be used to engage the first side hinge arms 123 with the first center hinge arm 111. The rotation pins 109 are rotatably engaged with the first side hinge arms 123, fixed to both ends of the first center hinge arm 111, thereby supporting the rotation of the second housing 102.

While not shown, the second housing 102 has a keypad, a transmitter and a receiver on one surface 121 thereof to implement the typical communication functionality of the portable terminal 100. A small-size display can further be provided on the surface 121 of the second housing 102 to display basic information, for example, the phone number of the other party, antenna transmission/reception sensitivity, date and time.

Guide rails 167 are provided on the second housing 102. The guide rails 167 are installed on the inner surface of the second housing 102, particularly on the inner surface of the cover plate 102a. Guide holes 129 are formed on the rotation housing 102a along the length of the guide rails 167. Therefore, as the guide holes 129 are formed on the rear surface of the second housing 102, the guide rails 167 are exposed outward from the second housing 102. The guide rails 167 are extended perpendicularly to the hinge axis of the first center hinge arms 111 and the first side hinge arms 123 of the first and second housings 101 and 102.

The third housing 103 is provided, on one surface thereof, with a large display 131 and at one end thereof, with a pair of second side hinge arms 133 facing each other. As the third housing 103 rotates, the display 131 is opened or closed by the second housing 102. The third housing 103 is rotatably engaged with the other portion of the first housing 101. To engage the third housing 103 with the first housing 101, the portable terminal 100 has a sliding plate 104. That is, the third housing 103 is engaged on the first housing 101 by means of the sliding plate 104.

The sliding plate 104 faces the inner surface of the cover housing 101b of the first housing 101 and is slidably received into the first housing 101 by the guidance of ribs formed in the base housing 101a. A slide hole 119 of the cover housing 101b is extended lengthwise at the other portion of the first housing 101, for allowing the sliding plate 104 to advance or recede therethrough within the first housing 101.

The sliding plate 104 is provided, at one end thereof, with a second center hinge arm 141. Since the second center hinge arm 141 is too large to pass through the slide hole 119, the second center hinge arm 141 is kept exposed from the other portion of the first housing 101, even when the sliding plate 104 is inserted into the first housing 101.

At least one elastic member 143 is mounted in the first housing 101 to exert an elastic force such that the sliding plate 104 is inserted into the first housing 101. One end of the elastic member 143 is supported inside the first housing 101 and the other end thereof is supported by the sliding plate 104. The positions at which both ends of the elastic member 143 are supported can be easily set by those skilled in the art.

The third housing 103 is rotatably engaged with the first housing 101, particularly over the sliding plate 104 by means of a rotation pin 109, as easily understood from the engagement mechanism between the first and second housings 101 and 102. In the mean time, a known hinge module 105 may be used in engaging the second or third housing 102 or 103 on the first housing 101. In the embodiment of the present invention, the third housing 103 is engaged with the first housing 101 by the hinge module 105. To accommodate the hinge module 105, an accommodation hole 145 is formed at an end of the second center hinge arm 141. The hinge module 105 provides a rotation force in a direction to fold or unfold the third housing 103 to or from the first housing 101 according to the rotation angle between the third housing 103 and the first housing 101. This hinge module 105 is disclosed in various forms in U.S. Pat. No. 6,292,980 issued to the present applicant on Sep. 25, 2001.

While the use of the hinge module 105 is confined to engagement between the third housing 103 and the first housing 101 in the preferred embodiment of the present invention, it is obvious that it can also be used to engage the first housing 101 with the second housing 102.

Meanwhile, the other portion of the third housing 103 is so configured that the third housing 103 linearly advances toward or recedes from the hinge engagement between the first housing 101 and second housings 102, closely beneath the rear surface of the second housing 102. This is possible by engaging sliders 106 installed at the other end of the third housing 103 with the guide rails 167 so as to slide along the guide rails 167.

The sliders 106 are rotatably engaged in engagement grooves 137 formed at the other end of the third housing 103. Each of the sliders 106 is provided with a rotation hole 161 and a support pin 165 is extended through the rotation hole 161 such that the slider 106 is rotatably engaged in the engagement groove 137. The sliders 106 are installed at both ends of the other end of the third housing 103 and are provided, on the outer surface thereof, with sliding grooves 163 for surrounding the outer circumferential surface of the guide rails 167. Thus the sliders 106 slide along the guide rails 167 on the rear surface of the second housing 102, surrounding the outer circumferential surfaces of the guide rails 167 with the sliding grooves 163.

Because the sliders 106 are engaged rotatably with the third housing 103 and slidably with the second housing 102, the other portion of the third housing 103 linearly moves closely beneath the rear surface of the second housing 102.

Figure 5:
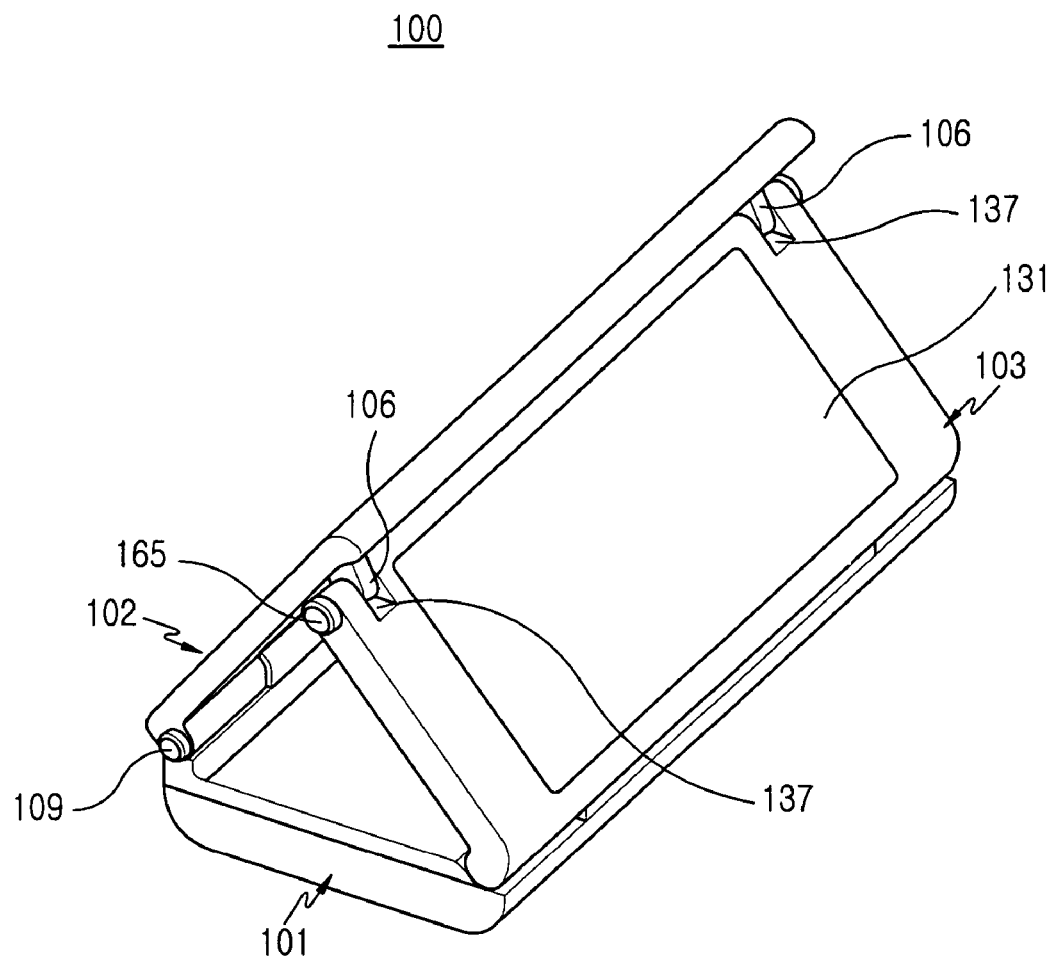

As one ends of the second and third housings 102 and 103 are rotatably engaged on the first housing 101 and the other end of the third housing 103 is engaged with the second housing 102 such that it can make a linear movement closely beneath the rear surface of the second housing 102, the second and third housings 102 and 103 each can rotate only to a limited angle in a receding direction from the first housing 101. Consequently, as the second and third housings 102 and 103 rotate, receding from the first housing 101, the portable terminal 100 is posed in the form of a triangular prism as illustrated in FIG. 5. The rotation angles of the second and third housings 102 and 103 are determined by the widths of the second and third housings 102 and 103 and the length of the guide holes 129.

The hinge module 105 installed in the sliding plate 104 exerts a driving force in a direction to fold the third housing 103 toward the first housing 101 or in a direction to retreat the third housing 103 from the first housing 101 according to the rotation angle of the third housing 103, as stated before. If the portable terminal 100 is so configured that the third housing 103 can rotate up to 40 degrees, the hinge module 105 provides a driving force in the direction to fold the third housing 103 toward the first housing 101 in the state where the third housing 103 is rotated from the first housing 101 at or below 20 degree. If the rotation angle of the third housing 103 exceeds 20 degree, the hinge module 105 provides a driving force in the direction to retreat the third housing 103 from the first housing 101. A rotation angle at which the driving force of the hinge module 105 is changed may vary depending on products.

Figure 4:
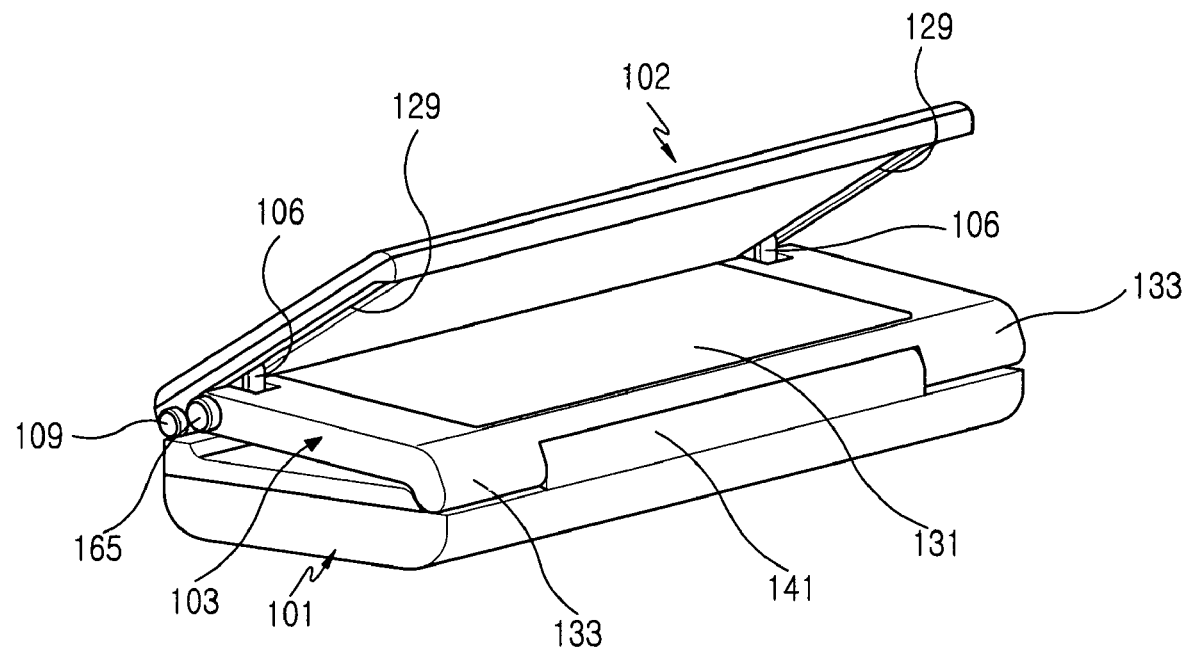
FIGS. 4 and 5 are perspective views sequentially illustrating rotation of second and third housings in the portable terminal illustrated in FIG. 1.

FIG. 4 illustrates the portable terminal 100 in which the second and third housings 102 and 103 start to open from the first housing 101. When a user rotates the second housing 102 in an unfolding direction from the first housing 101 in order to open the second and third housings 102 and 103 in a folded state, the third housing 103 also rotates while the sliders 106 slide along the guide rails 167. As described earlier, the hinge module 105 provides its driving force in the direction to fold the third housing 103 toward the first housing 101 until before the third housing 103 rotates to or above a predetermined angle with respect to the first housing 101. Therefore, the driving force of the hinge module 105 imposed on the third housing 103 tends to fold the second housing 102 toward the first housing 101 if the third housing 103 rotates within a predetermined angle range from the first housing 101.

As the second and third housings 102 and 103 rotate away from the first housing 101 at or above the predetermined angle, the driving force of the hinge module 105 is exerted in the direction that makes the second and third housings 102 and 103 unfold from the first housing 101. Hence, even though the user does not further rotate the second or third housing 102 or 103, the second and third housings 102 and 103 are rotated until the portable terminal 100 is unfolded in the form of a triangular prism, as illustrated in FIG. 5.

Consequently, the use of the hinge module 105 semi-automates the opening of the display 131 on the third housing 103.

When the display 131 is opened, the user can place the first housing 101 on a plane such as a table to conveniently view a broadcasting program such as a DMB program. Since the display 131 is posed with a width larger than a length, the broadcasting program can be viewed with full utilization of the limited area of the display 131.

Figure 6:
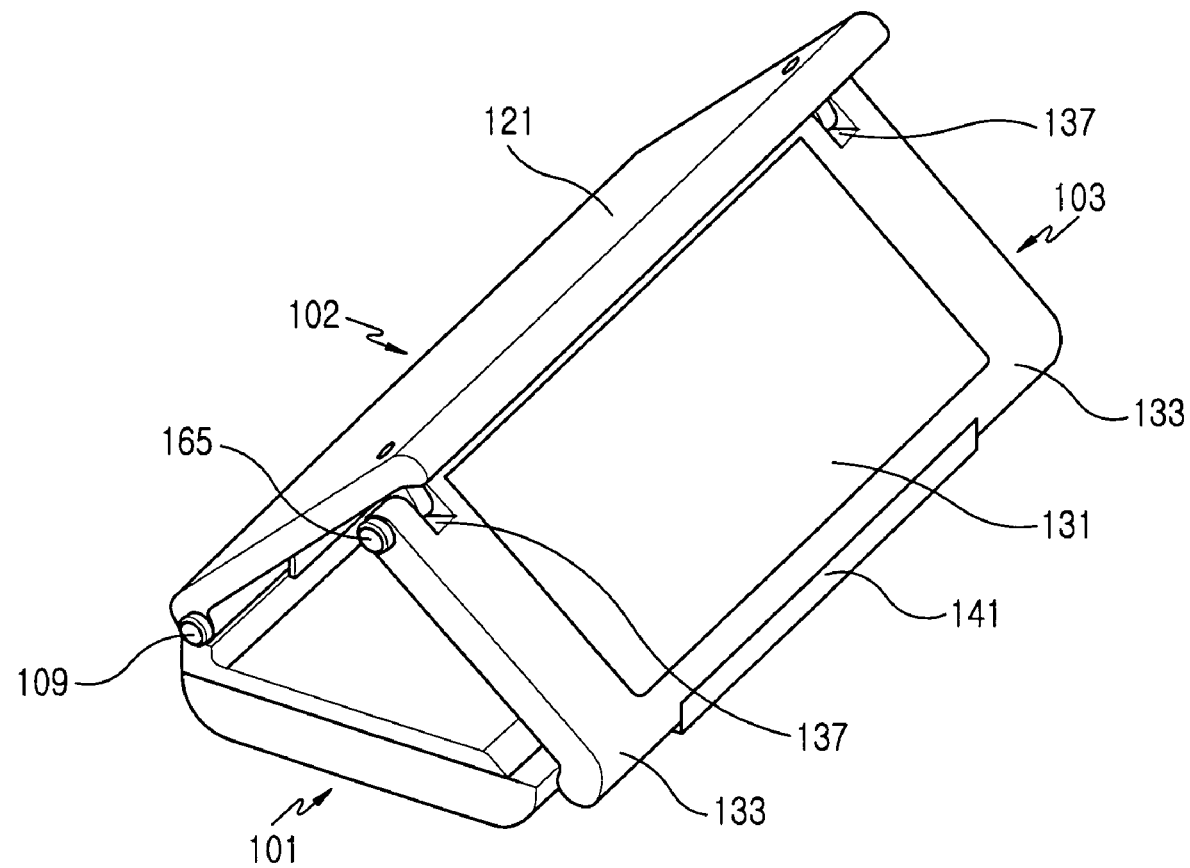
FIGS. 6 and 7 are perspective views illustrating folding of the second and third housings in the portable terminal illustrated in FIG. 5.
Figure 7:
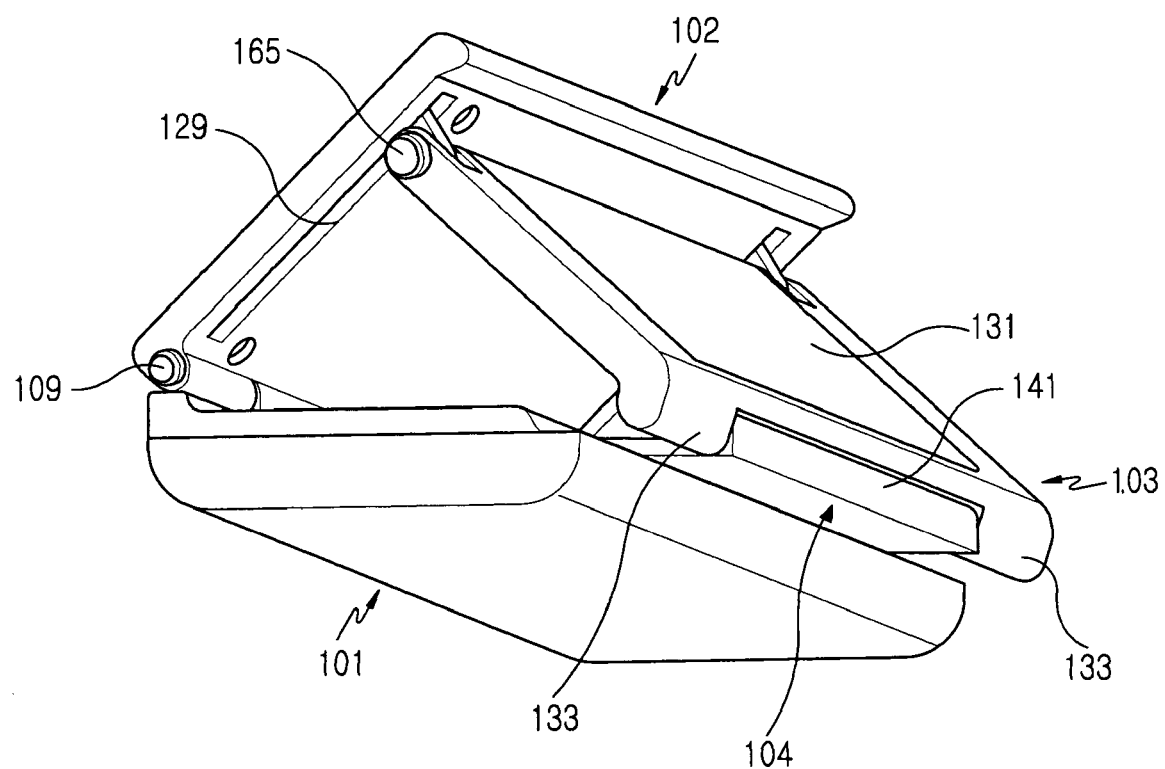
Figure 8:
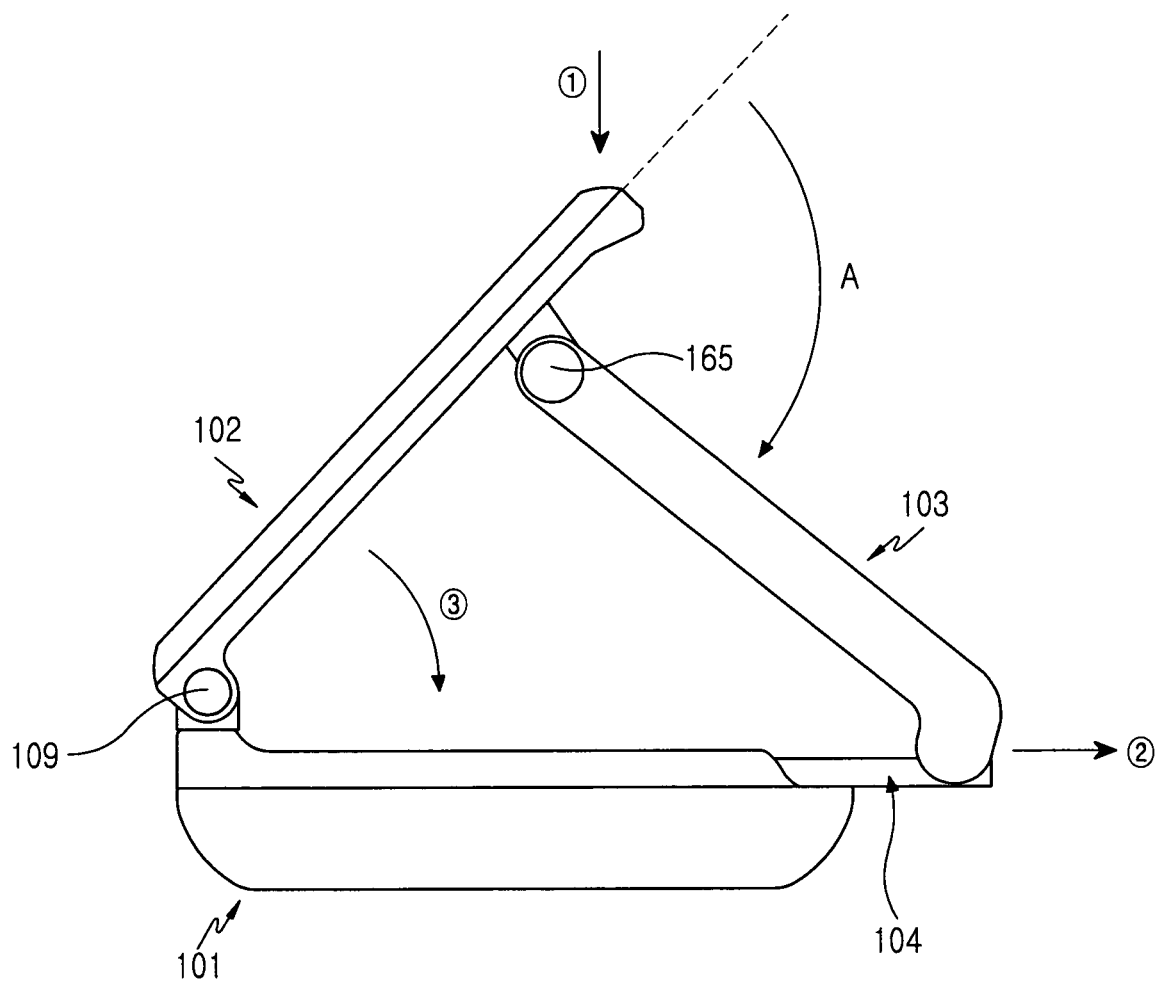
FIG. 8 is a side view of the portable terminal illustrated in FIG. 6.

FIGS. 6, 7 and 8 sequentially illustrate folding of the second and third housings 102 and 103 toward the first housing 101. Referring to FIG. 8, in the state where the second and third housings 102 and 103 are opened from the first housing 101, the user presses the second housing 102 in an advancing direction to the first housing 101 to fold the second and third housings 102 and 103 onto the first housing 101.

Since the second housing 102 is almost at the right angle A with the third housing 103, the sliders 106 cannot slide in the guide holes 129. In other words, at the angle A between the second and third housings 102 and 103, the pressure applied on the second housing 102 by the user cannot be transformed to a force to slide the sliders 106.

In folding the second and third housings 102 and 103, the sliding plate 104 slides and the angle A between the second and third housings 102 and 103 becomes smaller. Thus, the pressure on the second housing 102 is transformed to the force to slide the sliders 106.

When the user presses the second housing 102 in an arrowed direction (1), the second housing 102 rotates in a folding direction (3) to the first housing 101 and the sliding plate 104 moves in a receding direction (2) from the first housing 101. As the sliding plate 104 recedes from the first housing 101, the third housing 103 also rotates, advancing toward the first housing 101. As the second and third housings 102 and 103 rotate closer to the first housing 101, the angle A between the second and third housings 102 and 103 becomes smaller.

Figure 9:
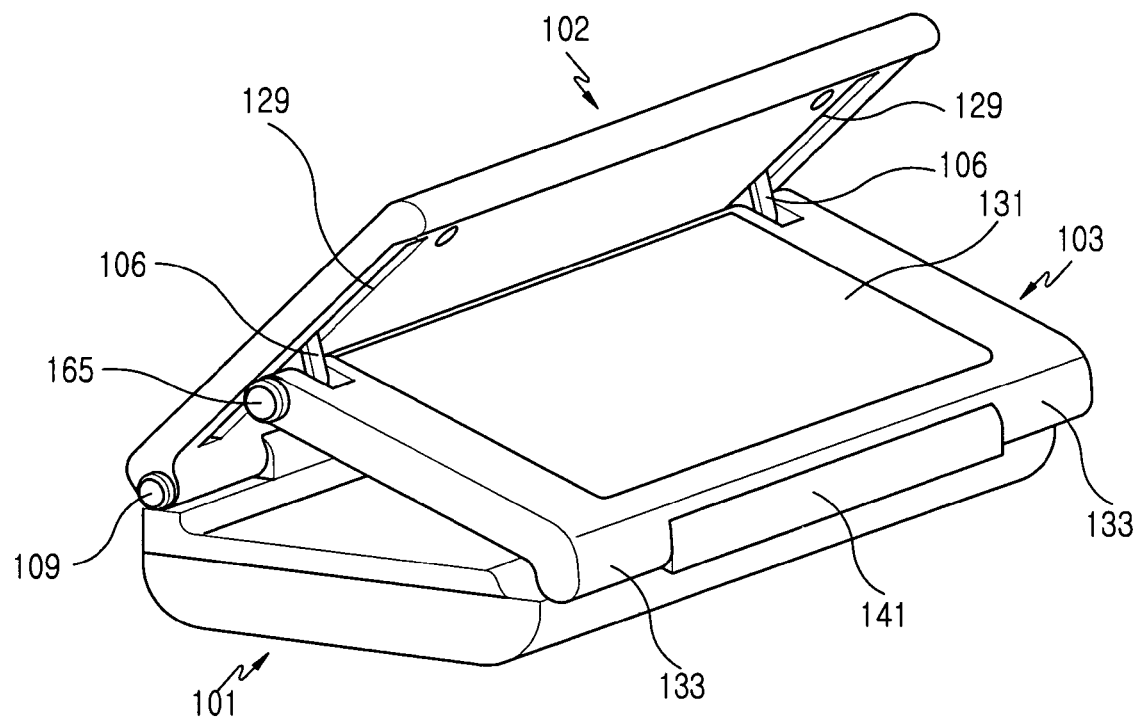
FIG. 9 is a perspective view illustrating the second and third housings rotated in a folding direction in the portable terminal illustrated in FIG. 6.
Figure 10:
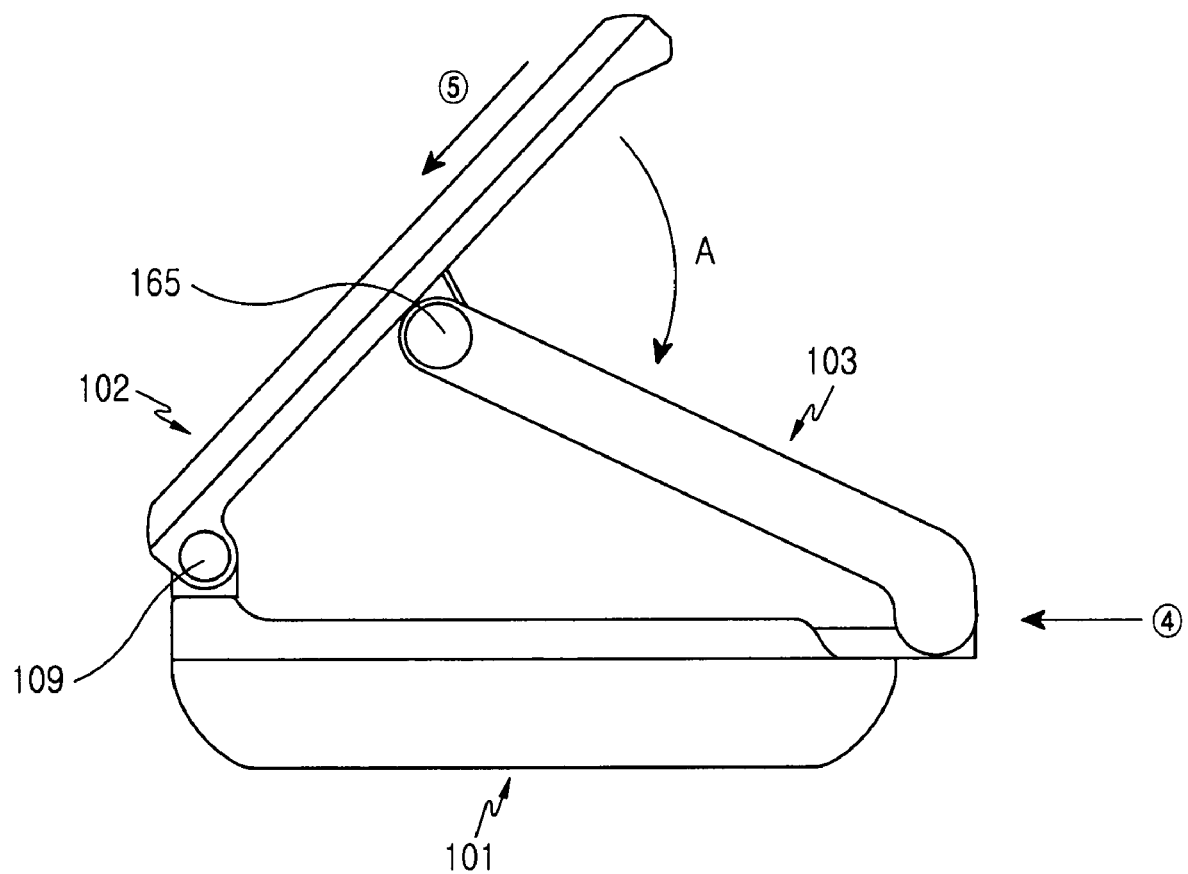
FIG. 10 is a side view of the portable terminal illustrated in FIG. 9.

Referring to FIGS. 9 and 10, as the angle A becomes smaller, the pressure on the second housing 102 now can be transformed to the force to slide the sliders 106. Simultaneously, as the angle between the first and third housings 101 and 103 becomes smaller, the driving force of the hinge module 105 is exerted in the direction that folds the third housing 103 to the first housing 101. An elastic force exerted in an arrowed direction (4) that inserts the sliding plate 104 into the first housing 101 is transformed to a force that moves the sliders 106 toward the hinge engagement between the first and second housings 101 and 102 in an arrowed direction (5).

As the other portion of the third housing 103 advances toward the hinge engagement between the first and second housings 101 and 102 along with the sliders 106, the angle A between the second and third housings 102 and 103 becomes much smaller and the driving force of the hinge module 105 and the elastic force on the sliding plate 104 fold the third housing 103 to the first housing 101.

Consequently, the closing operation of the display 131 of the third housing 103 is semi-automated by means of the forces of the hinge module 105 and the elastic member 143 of the first housing 101.

When the second and third housings 102 and 103 are folded on the first housing 101, the driving force of the hinge module 105 is exerted in a direction that brings the third housing 103 into close contact with the first housing 101. Therefore, the portable terminal 100 is kept stable in the folded state unless the user rotates the second and third housings 102 and 103.

Figure 11:
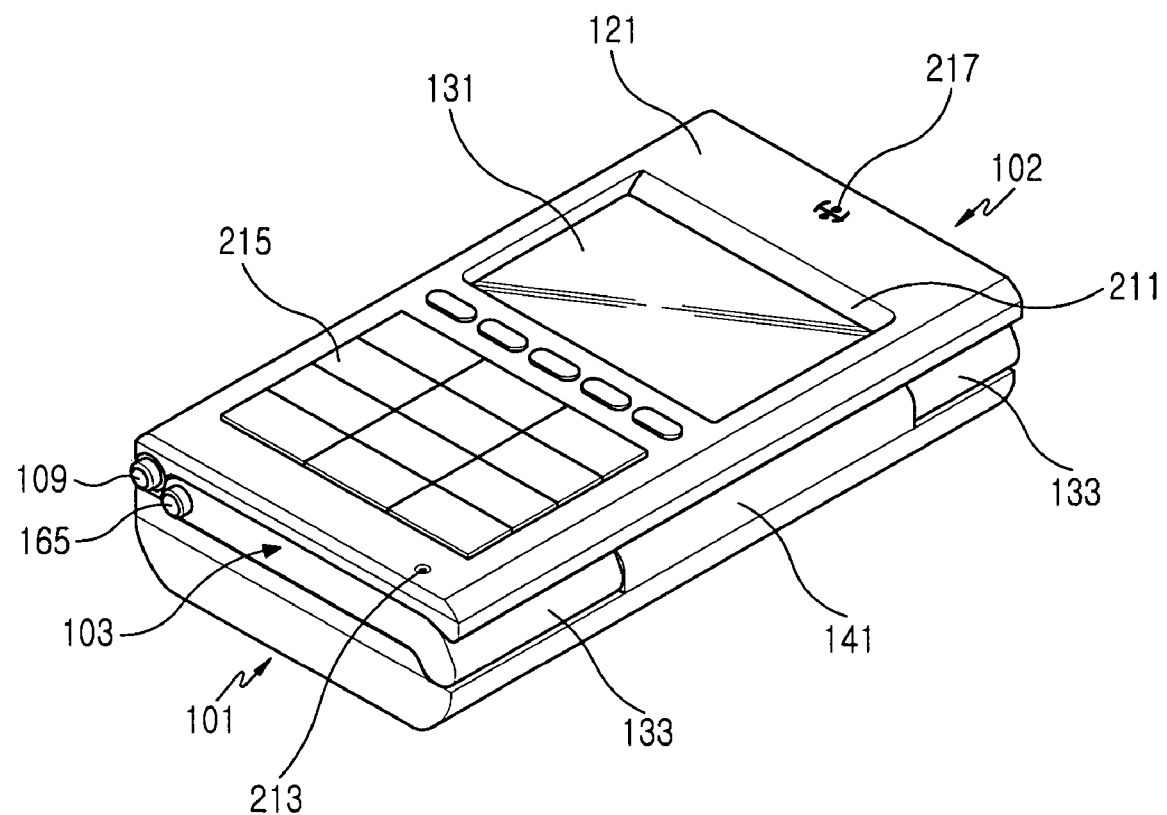
FIG. 11 is a perspective view of a portable terminal according to an alternative preferred embodiment of the present invention.

FIG. 11 is a perspective view of the portable terminal 100 according to an alternative preferred embodiment of the present invention. The difference between the two embodiments of the present invention lies in that the portable terminal 100 is configured to have a display 131 exposed through an opening 211 formed on the second housing 102 in the alternative embodiment. The following description is made with the appreciation that the same components as in the first embodiment are denoted by like reference numerals or not denoted and their detailed description is not provided herein.

The second housing 102 is provided with the opening 211 penetrating through both surfaces thereof. When the second and third housings 102 and 103 are folded on the first housing 101, the display 131 is exposed through the opening 211. Thus, the user can view information displayed on the display 131 even in the folded state. The displayed information includes basic communication information and terminal state information, such as date, time, antenna transmission/reception sensitivity, battery status, and an SMS message incoming indication.

A keypad 215 and a transmitter 213 are provided at one side of the opening 211, and a receiver 217 is provided at the other side of the opening 211. Hence, the portable terminal 100 takes the form of a bar type in the folded state. The user can enjoy basic communications in the folded state, whereas he can view a broadcasting program conveniently through the display 131 on the third housing 103 when the second and third housings 102 and 103 rotate away from the first housing 101 and thus the housings 101, 102 and 103 form a triangular prism.

Figure 12:
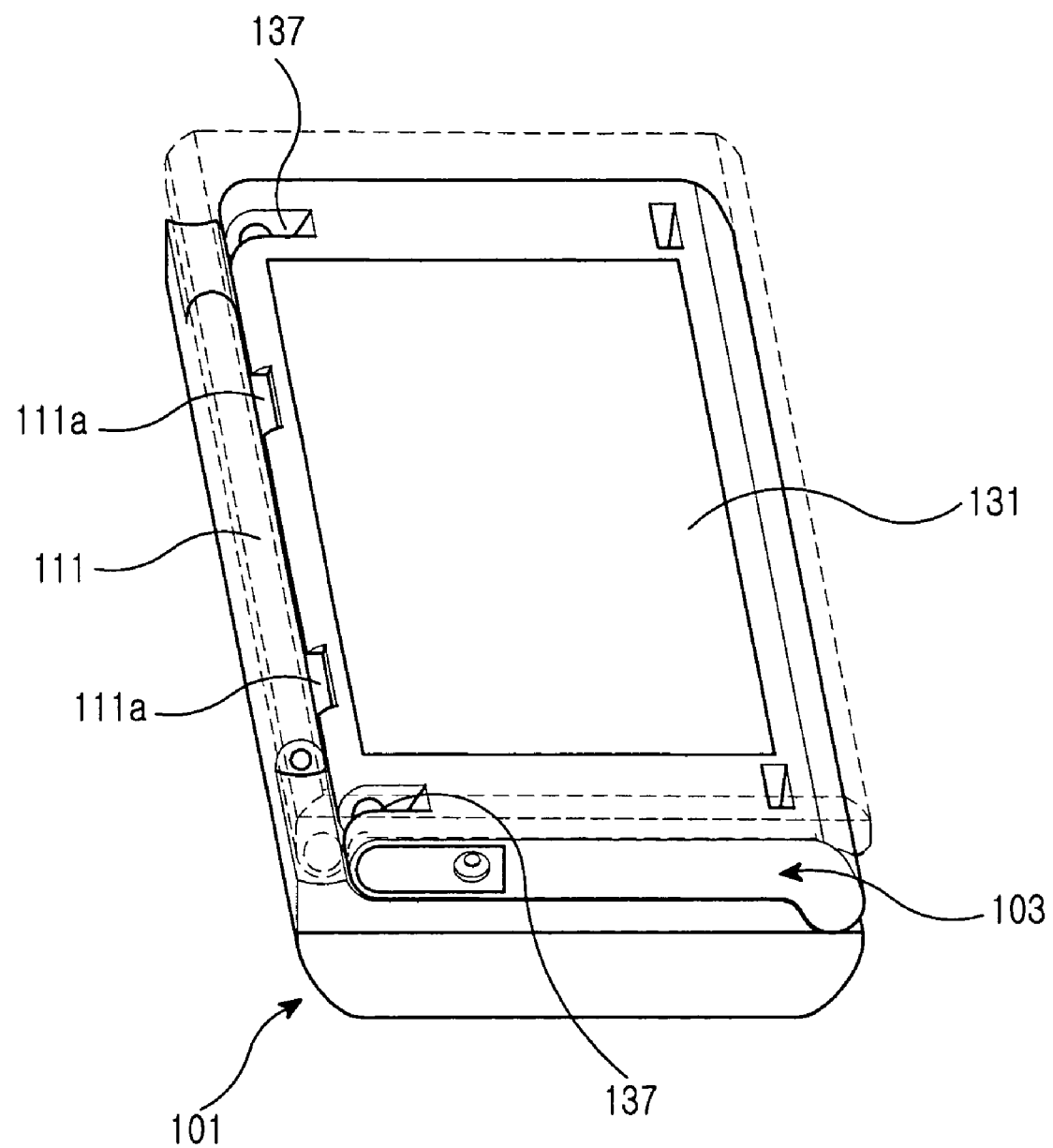
FIG. 12 is a partial perspective view of a portable terminal according to a further preferred embodiment of the present invention.
Figure 13:
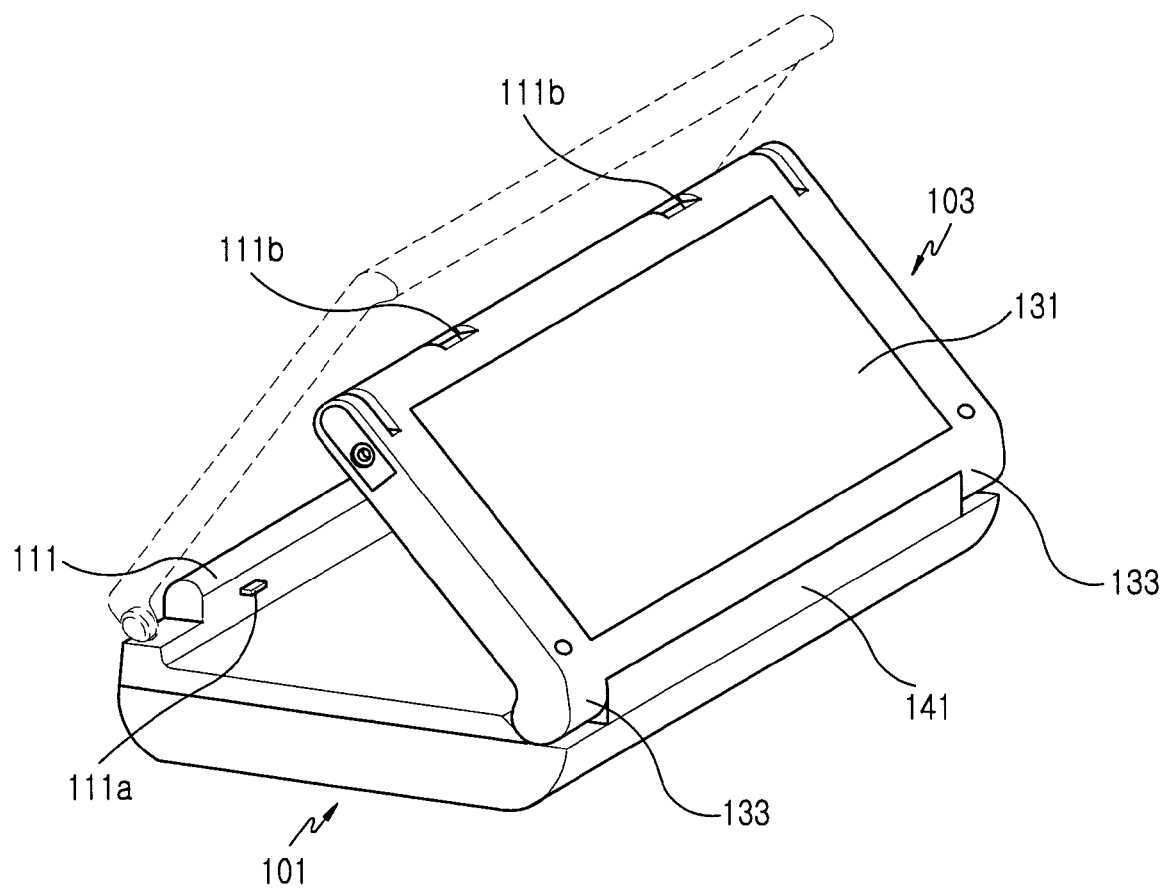
FIG. 13 is a perspective view illustrating a third housing rotated in a receding direction from a first housing in the portable terminal illustrated in FIG. 12.

FIGS. 12 and 13 illustrate the portable terminal 100 according to a further preferred embodiment of the present invention. This portable terminal 100 is characterized in that it further includes fixing protrusions 111*a* and fixing grooves 111*b*. The following description is made with the appreciation that the same components as those in the above two embodiments are denoted by like reference numerals or not denoted and their detailed description is not provided. Also, the second housing 102 common to the three embodiments is not shown herein in order to make the fixing protrusions 111*a* and the fixing grooves 111*b* more conspicuous.

The fixing protrusions 111*a* are formed on the first housing 101, and the fixing grooves 111*b* are formed at one end of the third housing 103. The fixing protrusions 111*a* are preferably formed on the inner surface of the center hinge arm 111 of the first housing 101, at which the center hinge arm 111 faces the end of the third housing 103 only when the third housing 103 is folded on the first housing 101.

When the third housing 103 is folded on the first housing 101, the fixing protrusions 111*a* are engaged with the fixing grooves 111*b*, thereby keeping the portable terminal 100 stable in the folded state. To unfold the third housing 103, the user rotates the second housing 102 in a unfolding direction from the first housing 101. At the same time, the sliders 106 slide on the rear surface of the second housing 102, making the third housing 103 unfold from the first housing 101.

Along with the rotation of the third housing 103 from the first housing 101 in the unfolding direction, the sliding plate 104 slides such that the fixing protrusions 111*a* are released from the engagement with the fixing grooves 111*b*.

With full release of the fixing protrusions 111*a* from the fixing grooves 111*b*, the hinge module 105 rotatably engaged with the sliding plate 104 exerts a driving force such that the third housing 103 rotates farther from the first housing 101.

In accordance with the present invention as described above, the second and third housings rotatably engaged with the first housing form a triangular prism, when they unfold to an open state from the first housing. Thus, the portable terminal can be placed on a plane like a table. This advantage makes it convenient to view a broadcasting program like a DMB program through the display on the third housing of the portable terminal. In addition, since the portable terminal can be placed in the posture that renders the width of the display to be larger than the length, the broadcasting program can be viewed with full utilization of the limited area of the display.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable wireless communication terminal comprising:
    a first housing comprising a first portion, a second portion spaced apart from the first portion, and a sliding plate;
    a second housing comprising a rear surface, the second housing rotatably engaged with the first portion of the first housing; and
    a third housing comprising a first end and a second end spaced apart from the first end, the first end of the third housing engaged with the second housing to linearly move beneath the rear surface of the second housing, and the second end of the third housing rotatably engaged with the sliding plate of the first housing; and
    wherein the sliding plate is slidable on the first housing; and
    wherein when the third housing is folded onto the first housing, the third housing is interposed between the first housing and the second housing, and when the second housing and the third housing rotate away from the first housing, the first, second and third housings form a triangular prism.

2. The portable wireless communication terminal of claim 1, wherein when the second housing and the third housing rotate away from the first housing, the third housing supports the rear surface of the second housing.

3. The portable wireless communication terminal of claim 1, further comprising:
    at least one guide rail installed on the second housing; and
    a slider installed at the one end of the third housing and slidably engaged with the at least one guide rail,
    wherein when the second housing and the third housing rotate away from the first housing, the slider slides along the at least one guide rail.

4. The portable wireless communication terminal of claim 3, further comprising a guide hole formed on the rear surface of the second housing,
    wherein the at least one guide rail is provided on an inner surface of the second housing and exposed from the rear surface of the second housing through the guide hole.

5. The portable wireless communication terminal of claim 1, wherein the third housing comprises:
    a slider installed to slide on the rear surface of the second housing; and
    an engagement groove formed at the one end of the third housing and engaged with the slider so that the slider is partially received in the engagement groove and can rotate.

6. The portable wireless communication terminal of claim 1, further comprising:
    a center hinge arm formed at the one portion of the first housing; and
    a pair of side hinge arms formed facing each other at one portion of the second housing,
    wherein the side hinge arms are rotatably engaged with both ends of the center hinge arm.

7. The portable wireless communication terminal of claim 6, further comprising:
    a fixing protrusion formed on the center hinge arm; and
    a fixing groove formed on the third housing,
    wherein when the third housing is folded onto the first housing, the fixing protrusion is engaged in the fixing groove.

8. The portable wireless communication terminal of claim 7, wherein the fixing protrusion is formed on an inner surface of the center hinge arm and the fixing groove is formed at the one end of the third housing.

9. The portable wireless communication terminal of claim 1, further comprising a display installed on one surface of the third housing, the display being exposed when the second and third housings rotate away from the first housing.

10. The portable wireless communication terminal of claim 1, further comprising a plurality of rotation pins rotatably engaged with the second and third housings, respectively, and fixed onto the first housing, for supporting the rotation of the second and third housings with respect to the first housing.

11. The portable wireless communication terminal of claim 1, further comprising:
    a second center hinge arm formed at an end of the sliding plate; and
    a pair of second side hinge arms facing each other at the opposite end of the third housing,
    wherein the second side hinge arms are rotatably engaged with both ends of the second center hinge arm.

12. The portable wireless communication terminal of claim 1, further comprising a slide hole formed at the opposite portion of the first housing,
   wherein the sliding plate is inserted into and retracted from the first housing through the slide hole.

13. The portable wireless communication terminal of claim 12, wherein when the second and third housings are folded onto the first housing, the sliding plate is retracted from the first housing and the third housing advances toward the engagement between the first and second housings.

14. The portable wireless communication terminal of claim 12, further comprising at least one elastic member having one end supported inside the first housing and the other end supported by the sliding plate, the elastic member being adapted to exert an elastic force in a direction to insert the sliding plate into the first housing.

15. The portable wireless communication terminal of claim 1, further comprising:
   an opening penetrating through opposite surfaces of the second housing; and
   a display provided on the surface of the third housing, wherein when the second and third housings are folded onto the first housing, the display is partially exposed through the opening.

16. The portable wireless communication terminal of claim 15, wherein one portion of the third housing is rotatably engaged with the first housing and the opposite portion of the third housing is engaged to linearly move closely beneath the rear surface of the second housing.

17. The portable wireless communication terminal of claim 15, further comprising a sliding plate installed to be slidable on the first housing, wherein the third housing is rotatably engaged with the sliding plate.

18. The portable wireless communication terminal of claim 17, further comprising:
   a second center hinge arm formed at an end of the sliding plate; and
   a pair of second side hinge arms facing each other at the third housing,
   wherein the second side hinge arms are rotatably engaged with both ends of the second center hinge arm.

19. The portable wireless communication terminal of claim 18, further comprising a hinge module accommodated in the center hinge arm, the hinge arm being adapted for exerting a driving force in a direction to fold the third housing onto the first housing or in a direction to retreat the third housing from the first housing according to a rotation angle of the third housing.

20. The portable wireless communication terminal of claim 15, further comprising:
   at least one guide rail installed on the second housing; and
   a slider installed at the third housing and slidably engaged with the at least one guide rail,
   wherein when the second housing and the third housing rotate away from the first housing, the slider slides along the at least one guide rail.

21. The portable wireless communication terminal of claim 20, further comprising a guide hole formed on a rear surface of the second housing,
   wherein the at least one guide rail is provided on an inner surface of the second housing and exposed from the rear surface of the second housing through the guide hole.

\* \* \* \* \*